US012682688B2

(12) United States Patent
Itare et al.

(10) Patent No.: US 12,682,688 B2
(45) Date of Patent: Jul. 14, 2026

(54) METHOD AND SYSTEM FOR DETERMINING A DISTANCE-TO-EMPTY CHARGE IN AN ELECTRIC VEHICLE

(71) Applicant: Intangles Lab Pvt. Ltd., Pune (IN)

(72) Inventors: Ravikant Itare, Barwaha (IN); Aman Singh, Pune (IN); Pushkar Nimkar, Redwood City, CA (US); Manav Chordia, Pune (IN); Khushdeep Nagi, Thane (IN); Pushkar Deshpande, Pune (IN); Mukund Nagare, Pune (IN); Bhushan Dayaram Patil, Pune (IN); Hariharan Ravishankar, Bengaluru (IN); Vikram Reddy Melapudi, Bengaluru (IN); Abhijit Vishwas Patil, Bengaluru (IN)

(73) Assignee: Intangles Lab Pvt. Ltd., Pune (IN)

( * ) Notice: Subject to any disclaimer, the term of this patent is extended or adjusted under 35 U.S.C. 154(b) by 15 days.

(21) Appl. No.: 18/802,253

(22) Filed: Aug. 13, 2024

(65) Prior Publication Data

US 2026/0051201 A1 Feb. 19, 2026

(51) Int. Cl.
*G07C 5/00* (2006.01)

(52) U.S. Cl.
CPC .................................... *G07C 5/004* (2013.01)

(58) Field of Classification Search
CPC ...................................................... G07C 5/004
USPC ............................................................ 701/22
See application file for complete search history.

(56) References Cited

U.S. PATENT DOCUMENTS

| | | | | |
|---|---|---|---|---|
| 2013/0158758 | A1* | 6/2013 | Kim | G07C 5/004 701/123 |
| 2017/0184413 | A1* | 6/2017 | Gilman | B60K 35/215 |
| 2020/0117204 | A1* | 4/2020 | Lindemann | B60L 53/63 |
| 2020/0171972 | A1* | 6/2020 | Cha | B60K 35/28 |
| 2020/0265654 | A1* | 8/2020 | Kapadia | G07C 5/004 |
| 2024/0185643 | A1* | 6/2024 | Joo | G06N 20/00 |
| 2025/0118111 | A1* | 4/2025 | Fridén | G01C 21/3469 |
| 2025/0140026 | A1* | 5/2025 | Liu | G07C 5/004 |

* cited by examiner

*Primary Examiner* — Mahmoud S Ismail
(74) *Attorney, Agent, or Firm* — Dennemeyer & Associates LLC

(57) ABSTRACT

Methods and Systems are provided for predicting a distance until the batter in an electric vehicle is discharged. Vehicle and geophysical data are received and formatted in n epochs over a time period T. For each epoch, an epoch data structure including a total energy consumption rate, a state of charge rate, and a distance rate is generated. The epochs are processed using a vector autoregression model to generate a predicted epoch data structure. A predicted state of charge is calculated using a state of charge model. A predicted distance traveled in the next epoch is calculated. A predicted charge to empty is calculated and checked to determine if the predicted charge to empty has reached an empty level. The process is repeated until the predicted charge to empty reaches an empty level. The distance to empty is then reported to the driver.

22 Claims, 5 Drawing Sheets

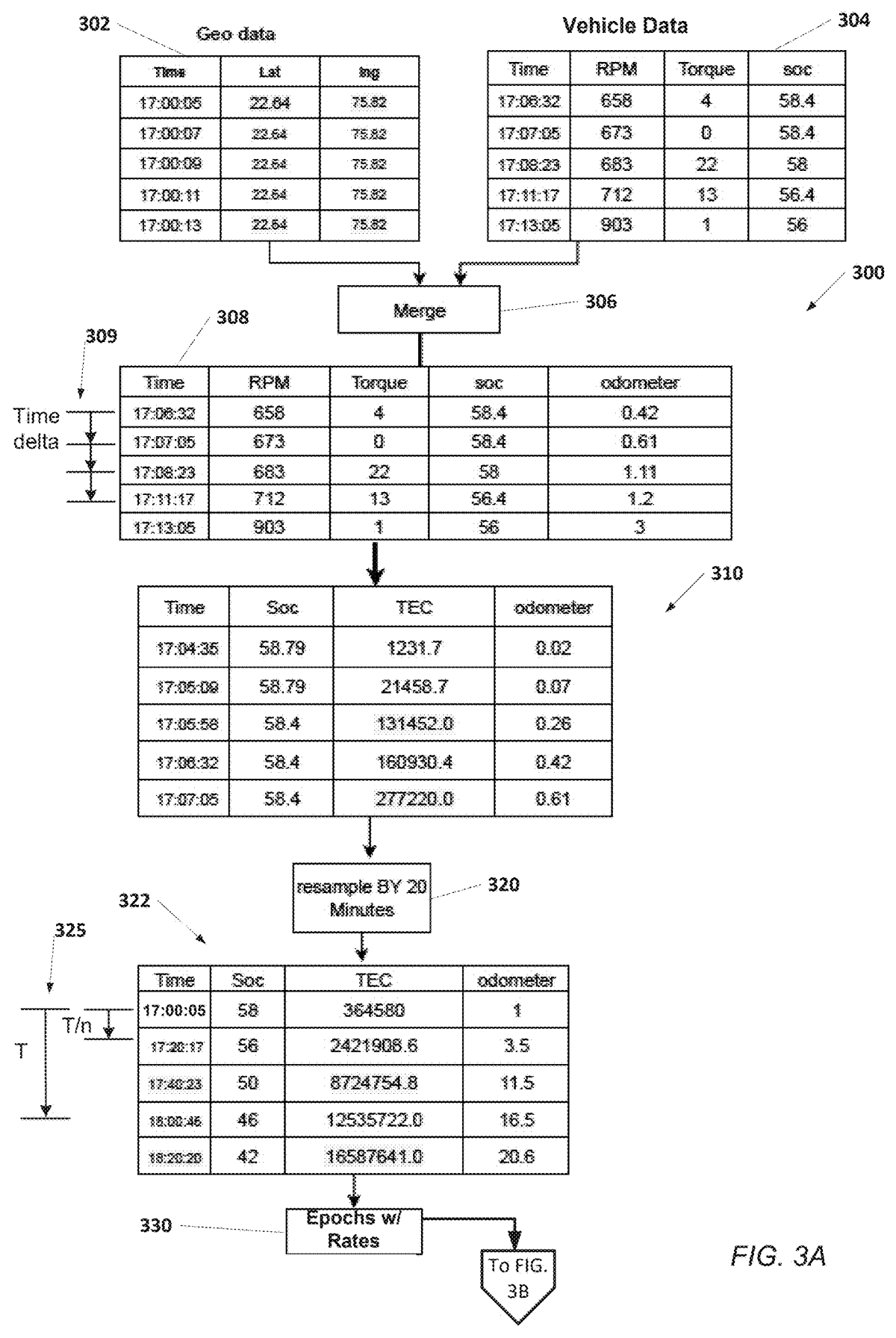

300

302 Geo data

| Time | Lat | lng |
|---|---|---|
| 17:00:05 | 22.64 | 75.82 |
| 17:00:07 | 22.64 | 75.82 |
| 17:00:09 | 22.64 | 75.82 |
| 17:00:11 | 22.64 | 75.82 |
| 17:00:13 | 22.64 | 75.82 |

Vehicle Data 304

| Time | RPM | Torque | soc |
|---|---|---|---|
| 17:06:32 | 658 | 4 | 58.4 |
| 17:07:05 | 673 | 0 | 58.4 |
| 17:08:23 | 683 | 22 | 58 |
| 17:11:17 | 712 | 13 | 56.4 |
| 17:13:05 | 903 | 1 | 56 |

Merge 306

308

309 Time delta

| Time | RPM | Torque | soc | odometer |
|---|---|---|---|---|
| 17:06:32 | 658 | 4 | 58.4 | 0.42 |
| 17:07:05 | 673 | 0 | 58.4 | 0.61 |
| 17:08:23 | 683 | 22 | 58 | 1.11 |
| 17:11:17 | 712 | 13 | 56.4 | 1.2 |
| 17:13:05 | 903 | 1 | 56 | 3 |

310

| Time | Soc | TEC | odometer |
|---|---|---|---|
| 17:04:35 | 58.79 | 1231.7 | 0.02 |
| 17:05:09 | 58.79 | 21458.7 | 0.07 |
| 17:05:58 | 58.4 | 131452.0 | 0.26 |
| 17:06:32 | 58.4 | 160930.4 | 0.42 |
| 17:07:05 | 58.4 | 277220.0 | 0.61 |

resample BY 20 Minutes 320

322

325 T T/n

| Time | Soc | TEC | odometer |
|---|---|---|---|
| 17:00:05 | 58 | 364580 | 1 |
| 17:20:17 | 56 | 2421908.6 | 3.5 |
| 17:40:23 | 50 | 8724754.8 | 11.5 |
| 18:00:46 | 46 | 12535722.0 | 16.5 |
| 18:20:20 | 42 | 16587641.0 | 20.6 |

330 Epochs w/ Rates

To FIG. 3B

FIG. 3A

| Time | Soc_rate | TEC_rate | Odometer_rate |
|---|---|---|---|
| 17:20:17 | -0.00297 | 3064.23 | 0.0037 |
| 17:40:23 | -0.00359 | 3116.59 | 0.0044 |
| 18:00:46 | -0.00306 | 3451.37 | 0.0035 |
| 18:20:20 | 0.00231 | 3750.94 | 0.0028 |

T1 (17:40:23 row)
T2 (18:00:46 row)
T3 (18:20:20 row)

METHOD AND SYSTEM FOR DETERMINING A DISTANCE-TO-EMPTY CHARGE IN AN ELECTRIC VEHICLE

BACKGROUND

This disclosure relates generally to methods and systems for diagnosing charge levels in electrical power systems in motor vehicles; and more particularly, to methods and system for determining a distance an electric vehicle can travel until the electric power source approaches an empty level.

Since the use of electric vehicles has increased in the last 20 years, systems and methods for determining how much charge remains in a vehicle battery and, more importantly, how far the vehicle will travel. Internal combustion engines use fuel level meters on dashboards that are implemented quite simply using mechanical and/or electrical sensors. More recently, computer technology in vehicles that run using internal combustion engines have included features that report to the driver an approximate distance that can be traveled on the amount of fuel in the tank at any given time. There is a need for systems and methods for determining the distance an electric vehicle cab travel on the charge in the vehicle's battery at any given time.

The rate at which a battery is discharged during use can vary based on various factors. Such factors include temperature, load, and daily driving patterns. Many methods have been developed for determining a distance left on a battery charge, but most have not proved sufficiently reliable. There is a need in the art for accurate and reliable systems and methods for determining the distance that can be traveled until the discharge of the battery of an electric vehicle.

SUMMARY

In example implementations described in this disclosure, systems and methods are provided for predicting a driving range of an electric vehicle power source. An example system includes a data interface configured to receive vehicle data from a vehicle data management system, and stored electric vehicle data from an electric vehicle data storage system. The vehicle data includes a timestamp, and for each timestamp, a current state of charge and a total energy consumption data set. The vehicle data is collected over time for storage in the electric vehicle data storage system.

The example system includes a distance-to-empty predictor comprising executable instructions stored as computer programs in a memory system. A processor executes the executable instructions of the computer programs of the distance-to-empty predictor. When executed, the distance-to-empty predictor:

receives a sample set of vehicle data collected over a sample time period, T, prior to a current time from the electric vehicle storage system, and receives a current temperature measurement;

initializes a predicted charge-to-empty to the state of charge at the current time, and a distance-to-empty to zero;

constructs a first set of n epoch data structures, $D(T_n)$, corresponding to n epochs, $t_n$, in the sample time period, T, with an epoch duration, T/n, each epoch data structure comprising a total energy consumed rate and an epoch speed, where the total energy consumed rate is based on a total energy consumed during each of the n epochs, which is calculated using the total energy consumption data set in the vehicle data, and where the epoch speed is based on a distance traveled over each epoch;

generate a predicted epoch data structure, $D(T_{n+1})$, including a predicted total energy consumed rate and a predicted epoch speed corresponding to a next epoch, $t_{n+1}$, using the set of n epoch data structures, $D(T_n)$, as inputs to a statistical model pre-trained to model a relationship between the total energy consumed rates and epoch speeds over a next epoch $t_{n+1}$;

generate a predicted state of charge rate for the next epoch, $t_{n+1}$, by inputting the temperature measurement and the predicted total energy consumption rate to a state of charge rate prediction model;

estimate a state of charge consumption by multiplying the predicted state of charge rate for the next epoch, $t_{n+1}$, by the epoch duration;

calculate a predicted next epoch distance based on the predicted epoch speed and the epoch duration;

update the distance-to-empty by adding the predicted next epoch distance to a current value of the distance-to-empty;

update the predicted charge-to-empty by subtracting the state of charge consumption from a current value of the predicted charge-to-empty;

report to a user interface the distance-to-empty when the predicted charge-to-empty is less than or equal to an EMPTY_VALUE; and when the predicted charge-to-empty is not less than or equal to EMPTY_VALUE:

construct a next set of n data structures including the predicted data structure, $D(T_{n+1})$, and the most recent n−1 epoch data structures in the previous set of n epoch data structures and repeat generating a predicted epoch data structure for a next epoch, generating the predicted state of charge rate for a next epoch, estimating the state of charge consumption for the next epoch, calculating the predicted next epoch distance, and updating the distance-to-empty and predicted charge-to-empty until the predicted charge-to-empty is less than or equal to EMPTY_VALUE.

The distance-to-empty predictor includes a memory system configured to store the executable instructions as computer programs, and a processor configured to execute the executable instructions of the computer programs.

In one aspect, the distance to empty predictor in an example system may receive total energy consumption data set as vehicle data that includes a torque and a motor speed. The calculation of the total energy consumption during each of the n epochs includes calculating a total energy consumption at each timestamp of the vehicle data received using:

$TEC(i)=speed(i)\times torque(i)$, where i=a timestamp index of the vehicle data; and where the calculation of the total energy consumed rate equal to the total energy consumed during each of the n epochs, $t_n$, comprises:

$$TEC(t_n) = \sum_{i=1}^{t} TEC(i) \times timedelta,$$

where timedelta=time elapsed between i and i−1, and t is the number of timestamps in the sample time interval, T.

In another aspect, the distance to empty predictor in an example system may receive total energy consumption data set as vehicle data that includes a input current and a throttle, and the calculation of the total energy consumption during each of the n epochs includes calculating a total energy consumption at each timestamp of the vehicle data received using:

TEC(i)=input current(i)×throttle(i), where i=a timestamp index of the vehicle data; and where the calculation of the total energy consumed rate equal to the total energy consumed during each of the n epochs, $t_n$, comprises:

$$TEC(t_n) = \sum_{i=1}^{t} TEC(i) \times timedelta,$$

where timedelta=time elapsed between i and i−1, and t is the number of timestamps in the timedelta.

In another aspect, the distance to empty predictor in an example system may receive total energy consumption data set as vehicle data that includes an input current and an input voltage, and the calculation of the total energy consumption during each of the n epochs includes calculating a total energy consumption at each timestamp of the vehicle data received using:

TEC(i)=input current(i)×input voltage(i), where i=a timestamp index of the vehicle data; and where the calculation of the total energy consumed rate equal to the total energy consumed during each of the n epochs, $t_n$, comprises:

$$TEC(t_n) = \sum_{i=1}^{t} TEC(i) \times timedelta,$$

where timedelta=time elapsed between i and i−1, and t is the number of timestamps in the timedelta.

In another aspect, the distance to empty predictor in an example system includes a statistical model pre-trained to model the relationship between the total energy consumed rates and epoch speeds over the next epoch that includes a vector autoregression model.

In another aspect, the distance to empty predictor in an example system is configured to, after generating the predicted data structure:

filter the predicted data set, $D(T_{n+1})$, using an outlier rejection model.

In another aspect, the outlier rejection model includes a Multivariate Conditional Distribution Outlier Rejection (MCDOR) model.

In another aspect, the distance to empty predictor is configured to, in generating the predicted state of charge rate, the state of charge rate prediction model includes a deep learning model.

In another aspect, the deep learning model is a feed-forward neural network.

In another aspect, the vehicle data includes odometer readings at the timestamp, and the distance to empty predictor is further configured to:

use the odometer readings to determine the distance traveled between each timestamp of the vehicle data;

adding the distance traveled between each timestamp to determine the distance traveled over each epoch; and use the geolocation data in determining the temperature value at the current location.

In another aspect, the distance to empty predictor is further configured to:

use geolocation data to determine the distance traveled between each timestamp of the geolocation data;

adding the distance traveled between each timestamp to determine the distance traveled over each epoch.

An example method of predicting a driving range of an electric vehicle includes:

receiving a sample set of vehicle data from a vehicle data management system collected over a sample time period, T, prior to a current time from a electric vehicle storage system, and a current temperature measurement;

initializing, by a processor, a predicted charge-to-empty to the state of charge at the current time, and a distance-to-empty to zero;

constructing, by the processor, a first set of n data structures, $D(T_n)$, corresponding to n epochs $t_n$, in the sample time period, T, with an epoch duration, T/n, each data structure comprising a total energy consumed rate and an epoch speed, where the total energy consumed rate is based on a total energy consumed during each of the n epochs, which is calculated using the total energy consumption data set in the vehicle data, and where the epoch speed is based on a distance traveled over each epoch;

generating, by the processor, a predicted data structure, $D(T_{n+1})$, including a predicted total energy rate and a predicted epoch speed corresponding to a next epoch, $t_{n+1}$, using the set of n data structures, $D(T_n)$, as inputs to a statistical model pre-trained to model a relationship between the total energy consumed rates and epoch speeds over a next epoch $t_{n+1}$;

generating, by the processor, a predicted state of charge rate for the next epoch, $t_{n+1}$, by inputting the temperature measurement and the predicted total energy consumption rate to a state of charge rate prediction model;

estimating, by the processor, a state of charge consumption by obtaining a predicted state of charge rate for the next epoch, $t_{n+1}$, and multiplying the epoch duration by the predicted state of charge rate;

calculating, by the processor, a predicted next epoch distance based on the adjusted predicted epoch speed and the epoch duration;

updating, by the processor, the distance-to-empty by adding the predicted next epoch distance to a current value of the distance-to-empty;

updating, by the processor, the predicted charge-to-empty by subtracting the state of charge consumption from a current value of the predicted charge-to-empty;

reporting, by the processor to a user interface, the distance-to-empty when the predicted charge-to-empty is less than or equal to an EMPTY_VALUE; and when the predicted charge-to-empty is not less than or equal to EMPTY_VALUE:

constructing, by the processor, a next set of n data structures including the predicted data structure, $D(T_{n+1})$, and the most recent n−1 data structures in the previous set of n data structures and repeat generating a predicted data structure for a next epoch, generating the predicted state of charge rate for a next epoch, estimating the state of charge consumption for the next epoch, calculating the predicted next epoch distance, and updating the distance-to-empty and predicted charge-to-empty until the predicted charge-to-empty is less than or equal to EMPTY_VALUE.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIGS. 3A and 3B is a schematic diagram illustrating processing and sampling of vehicle data to construct epoch data structures in predicting a distance to empty for an electric vehicle.

DETAILED DESCRIPTION

The following description with reference to the accompanying drawings is provided to assist in a comprehensive understanding of example implementations of systems and methods for predicting a driving range of an electric vehicle power source. It is to be understood that the implementations described below are examples and that this disclosure is not intended to limit the invention to any example described below.

For purposes of this disclosure, the word “current” in reference to time (i.e. “current time”) shall mean most recent. Data collected may be stored before it is received and the most recent data collected may not be exactly current.

For purposes of this disclosure, the word “odometer” shall be understood to refer broadly to distance.

Figure 1:
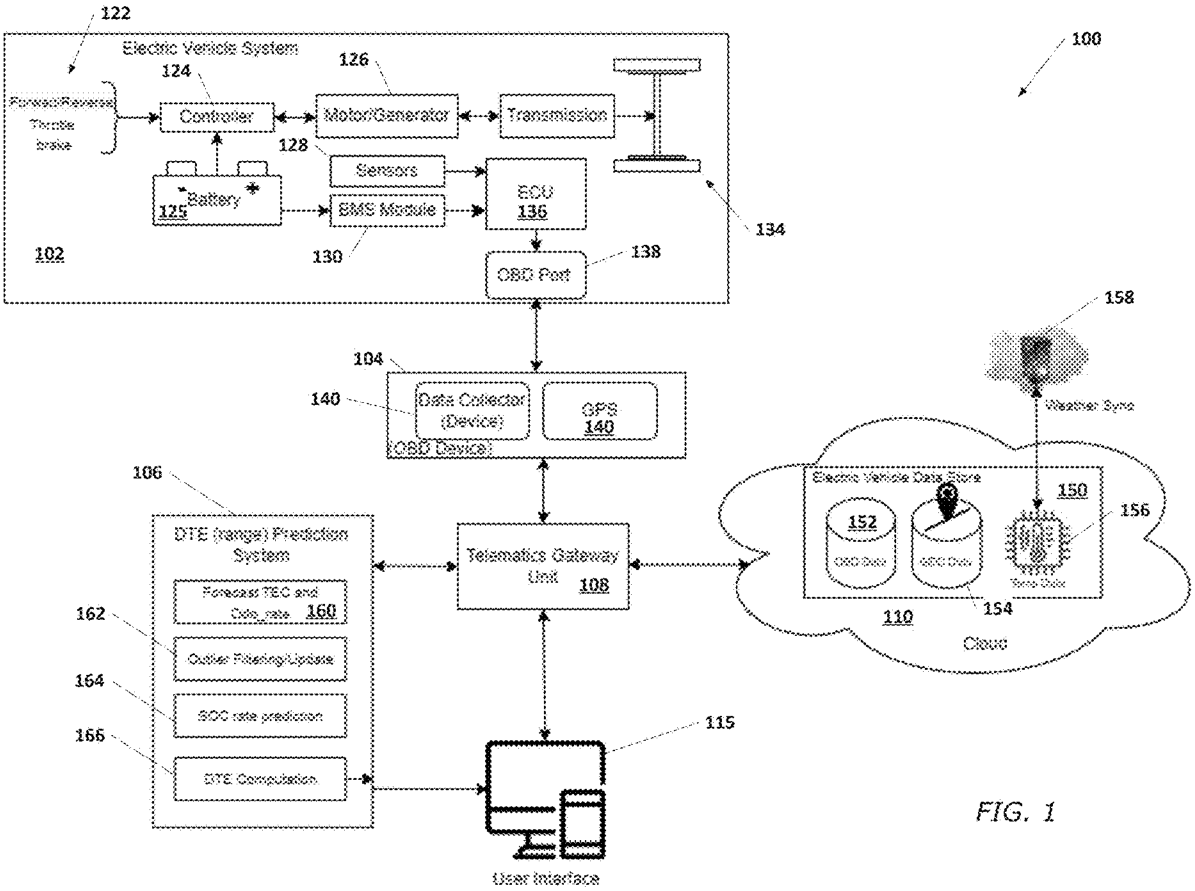
FIG. 1 is a schematic diagram of an example of a system for predicting a distance to empty for an electric vehicle.

FIG. 1 is a schematic diagram of an example of a system 100 for predicting a distance to empty for an electric vehicle 102. The electric vehicle 102 communicates vehicle data with an on-board diagnostic (“OBD”) device 104. The OBD device 104 communicates vehicle data to a distance-to-empty (DTE) prediction system 106, a cloud server 110, and a user interface 115 via a telematics gateway unit 108.

The electric vehicle system 102 includes a vehicle data interface 122 configured to communicate control data indicative of the driver’s actions to control the vehicle 102. The data may include data indicating the driver is controlling the direction of the vehicle (forward/reverse), or the drive power of the vehicle (throttle or accelerator pedal position), or the brake to stop the vehicle. The data is communicated to a controller 124, which then communications commands or other control information to the components in the electric vehicle that carry out the commands based on the user action sensed at the vehicle data interface 122. The controller 124 may for example, control a motor/generator 126 to increase or decrease speed based on the throttle or accelerator pedal.

The electric vehicle 102 also includes a battery 125, which provides electric power to the vehicle 102. The controller 124 may receive status information from the battery, such as a state of charge (SOC), which indicates a percentage of maximum charge in the battery 125 at any given time.

The battery 125 may communicate with a battery management system (BMS) module 128, which may be used to real-time monitoring of the operation status of each component of the energy storage system (battery).

The electric vehicle 102 may include sensors 128 that monitor parameters such as, motor speed (RPM), current, voltage, motor torque, throttle position, and any other parameter that may inform the controller or diagnostic systems on the status of the vehicle 102. It is noted, and discussed further below with reference to FIGS. 3 and 4, that some sensors may be used in some models of electric vehicles and not others.

An engine control unit (ECU) 136 may receive data from the sensors 128 and from the BMS module 128, which is used in performing electrical control functions in the electric vehicle 102. The engine control unit 136 may include a processor programmed to execute software that carries out the functions of the ECU 128.

The motor/generator 126 may include one or more electric motors configured to drive a transmission 132, which converts the rotational power suppled by the motors 126 to rotational power configured to drive the vehicle’s drive system 134, which may include the vehicle’s wheels. The motor/generator 126 may include a generator to generate supplemental power to drive other electrical functions, such a sound system, a computer-based user interface, data network communications, heating and cooling functions, etc.

The ECU 136 may communicate diagnostic data over an OBD port 138. The OBD device 104 may connect to the OBD port 138 using a suitable communications protocol. The OBD device includes a diagnostic data collection device 140 and a geographical data collection device 142. The diagnostic data collection device 140 may collect vehicle data indicative of the state of the electric vehicle. Such vehicle data may include, for example:

- motor speed/RPM (average motor speed for multiple motors)
- battery voltage
- current output from the battery
- throttle position indicative of the vehicle accelerator
- motor torque (average torque for multiple motors)
- odometer information indicative of distance that the vehicle has travelled
- timestamp corresponding to the time of the collection of an associated collection of data elements, such as any of the above data elements.

The geographical data collection device 142 may be a geophysical position sensor (GPS), which is a well-known component widely available in electric and combustion engine vehicles. It is noted that in some example implementations, the geophysical data collection device 142 may be a component that is separate from the OBD device 104.

The telematics gateway unit 108 may receive vehicle and geophysical data from the OBD device 104, and communicate the data to a user interface 115, and/or to the distance-to-empty prediction (DTE) system 106. The user interface 115 may include a computer-controlled console with a display and computing elements configured to compile and present vehicle information to the driver. For example, the user interface 115 may display the distance traveled much like a basic odometer on a combustion engine vehicle. The user interface 115 may provide a display of the speed at which the vehicle is traveling. The user interface 115 may also provide a data network interface to present information from the internet to the user, or to retrieve information from the internet or from the cloud server 110 that may be needed to perform various functions. The user interface 115 may also be used to control an infotainment system, and/or to report information from the DTE prediction system 106.

The cloud server 110 may be used to store electric vehicle data 150. The electric vehicle data may be stored in an OBD data store 152 and a geophysical data store 154. The data stored in the electric vehicle data store 150 may include vehicle and geo data collected during specified or unspecified time intervals. The vehicle data and the geo data may be stored with timestamps indicating the time and day on which the vehicle data was collected. In some implementations, the vehicle and geo data may be collected at regular, small, time intervals, such as for example, 5-10 seconds. The vehicle and geo data collected may be collected for a wide variety of functions in addition to the DTE prediction function possibly resulting in a timewise irregular collection of data.

The electric vehicle data store 150 may also include temperature data collected from a weather database 158 that provides temperatures in a geographical region. The temperature data 156 may include a temperature forecast model that provides a forecast temperature in a geographical location based on historical temperature data.

The DTE prediction system 106 may include a function 160 to forecast or predict total energy consumption TEC and distance traveled in a time period, an outlier filtering/update module 162 to filter outliers from predicted total energy consumption and distance traveled data, a state of charge (SOC) rate prediction module 164, and a DTE computation module configured to compute and report a distance to empty based on the predicted TEC, SOC, and distance traveled over a given time period.

It is noted that the functions indicated for the modules 162, 163, 164, and 165 in the DTE prediction system 106 may be performed as discussed below with reference to FIGS. 2-4. The term "module" shall not be understood to refer to any particular type of software construct or form of organization of software components.

Figure 2:
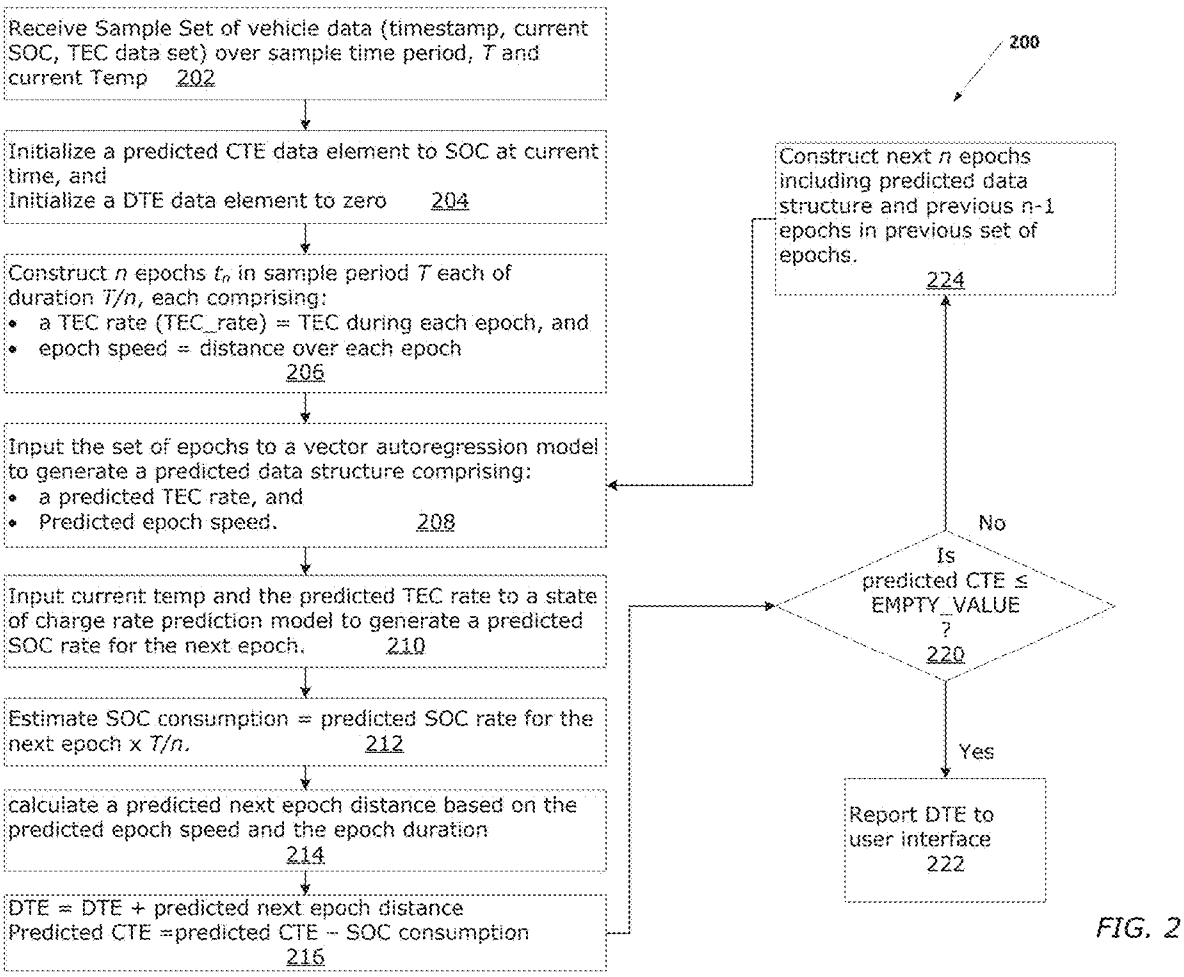
FIG. 2 is a flowchart illustrating operation of an example of a method for predicting a distance to empty for an electric vehicle.

FIG. 2 is a flowchart illustrating operation of an example of a method 200 for predicting a distance to empty for an electric vehicle. As noted above with reference to FIG. 1, vehicle data and geophysical data is collected at regular or irregular times and stored in the electric vehicle data store 110. At step 202, vehicle data and geophysical data is received at the DTE prediction system 106. The vehicle data and geophysical data may be received or organized upon reception as a sample set of vehicle and geophysical data collected over a period of T. In examples described herein, T is 60 minutes. In other example, T can be any length of time. The vehicle and geophysical data includes a timestamp indicating the time of detection or collection of the data, a state of charge at each timestamp, and a total energy consumed data in the time period between each timestamp. The total energy consumed (TEC) data may include data used to calculate the total energy consumed. Different data may be used depending on what is available in a specific implementation of the electric vehicle.

For example, data values for determining energy consumption may include rpm or motor speed, motor torque, input current to motor, throttle position, voltage to the motor, and others. Not all vehicles maintain the same vehicle data for determining energy consumption. Examples described below use three pairs of data elements to determine energy consumption, although it is to be understood that the description of the three pairs of data elements is not intended to be limiting in scope. Any combination of data elements that can be used to calculate energy consumption and that are available in the electric vehicle may be used.

The vehicle and geophysical data at the timestamp closest to the time of receiving the data corresponds to the current values for the data. For example, the timestamp for the time closest to the current time shall be the current time. The time period T shall be understood, for purposes of examples disclosed with reference to FIGS. 2-4, to refer to the time period extending from the current time to an hour before, and the sample set shall include all data elements collected within that hour. The vehicle and geophysical data is organized by time stamp and a total energy consumption value is calculated for the energy consumed within each time delta in chronological order. The total energy consumed within each time delta may be calculated in several ways depending on the information available in the vehicle data as described below with reference to FIG. 3A.

At step 204, predicted charge to empty (CTE) data element is initialized to the SOC at the current time, which is included in the vehicle data received at step 202. A distance-to-empty data element is initialized to zero. The values of the predicted CTE and the DTE are updated during execution of the steps in FIG. 2. Each time through, the predicted CTE is tested for a certain value, and the process is terminated when the predicted CTE reaches the value. The DTE at the time is reported to the driver.

At step 206, a number, n, of epoch data structures, $D(T_n)$, are constructed from the vehicle and geophysical data in the sample set. Each epoch data structure includes a TEC rate corresponding to the TEC consumed in each epoch, and an epoch speed, which corresponds to a distance traveled by the electric vehicle during the epoch.

At step 208, a predicted epoch data structure, $D(T_{n+1})$, is generated using a statistical model pre-trained to model a relationship between the total energy consumed rates and epoch speeds to generate the predicted epoch data structure for a next epoch $t_{n+1}$. At step 208, n+1 data structures are available for analysis, where n data structures correspond to most recent n values of the TEC rate and epoch speed in each of the n most recent epochs, and the predicted epoch data structure, $D(T_{n+1})$, corresponds to predicted values of the TEC rate and epoch speed for the next epoch, $t_{n+1}$.

At step 210, a temperature value and the predicted TEC rate from the predicted epoch data structure, $D(T_{n+1})$, are input to a state of charge rate prediction model to generate a predicted SOC rate for the next epoch, $t_{n+1}$.

At step 212, the predicted SOC rate is multiplied by the epoch time duration, T/n, to determine a SOC consumption in the next epoch, $t_{n+1}$.

At step 214, a predicted next epoch distance is determined based on the predicted epoch speed and the epoch duration, $t_{n+1}$. The predicted next epoch distance is the distance the vehicle is predicted to travel in the next epoch given the predicted epoch speed in the predicted epoch data structure, $D(T_{n+1})$.

At step 216, the DTE is updated by adding the predicted next epoch distance to the DTE value and re-stored as the updated DTE value. The predicted CTE is updated by subtracting the SOC consumption in the next epoch from the predicted CTE value and re-stored as the updated predicted CTE value. At decision block 220, the predicted CTE is compared to a predetermined charge percentage corresponding to a battery with empty charge, EMPTY_VALUE. The EMPTY_VALUE parameter may be 0% or a percentage greater than 0% deemed sufficiently close to no charge to be deemed empty.

If at decision block 220, the predicted CTE is less than or equal to the EMPTY_VALUE, the process is terminated and the DTE value is reported to the user at the user interface 115. If at decision block 220, the predicted CTE is not less than or equal to the EMPTY_VALUE, a next set of n epoch data structures, $D(T_n)$, is constructed at step 224. The next set of n epoch data structures corresponds to the most recent n/epochs used to determine the most recent predicted epoch data structure, $D(T_{n+1})$, and includes the predicted epoch data structure.

The next set of n epoch data structures is input to the vector autoregression model at step 208 to generate a next predicted epoch data structure. Control continues by executing steps 210, 212, 214, and 216 to test a next predicted CTE for a next updated DTE and continues with the addition of a new predicted epoch data structure each time the the process is repeated until the predicted CTE is less than or equal to the EMPTY_VALUE.

Figure 3B:
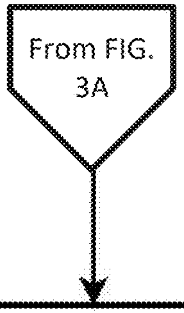

FIGS. 3A and 3B is a schematic diagram illustrating processing and sampling of vehicle data to construct epoch data structures in predicting a distance-to-empty for an electric vehicle. FIG. 3A shows a tabular representation of vehicle data elements 302. and a tabular representation of geo data 302. The vehicle and geo data may be in this format when received from the cloud storage 110. The geo data includes a latitude and longitude aligned with a timestamp indicating the time the data was collected. The vehicle data 304 in the illustrated example includes the timestamp, motor speed (RPM), torque, and SOC. The geo data 302 includes a timestamp, a latitude and a longitude. In some example, the vehicle data 304 may include an odometer reading that may be used in predicting the distance to empty.

The DTE prediction system (106 in FIG. 1) receives the vehicle data 304 and the geo data 302 and may perform a data merge 306 in which the TEC data and geo data are merged into the same records at each timestamp. In the illustrated example, the TEC data is the motor speed (RPM) and the motor torque. Other parameters may be used depending on what is available from the vehicle and may therefore be part of a merged data set 308. The merged data set 308 is shown in tabular form in FIG. 3A. The SOC value at each timestamp is also included in the merged data set 308.

The merged data set 308 may then be used to generate a second merged data set 310 in which the TEC is calculated at each timestamp. The TEC value determined for each timestamp corresponds to the total energy consumed at each timestamp. In addition, the distance traveled at each timestamp is calculated and provided in the second merged data set 310. The data in the second merged data set 310 is resampled at 320 to create data structures 322 defined by epochs 325. An epoch is a subdivision of time in the time period T covering the vehicle data received. In example implementations, n epochs are defined within the period T of equal value. In the illustrated example, the epoch, $t_n$, may be 20 minutes for a time period T=60 minutes. Other example implementations may use other total time periods T or number of epochs n. The resampled data structure 322 in FIG. 3A includes the time stamp for each epoch (at 20 min. intervals), the SOC at each epoch, the TEC at each epoch, and the distance traveled at each epoch.

As discussed above, the TEC may be calculated in different ways depending on the parameters available in a given vehicle. In the example in FIG. 3A, the TEC was determined using RPM and torque. In another example, TEC may be calculated using current input to the motor and throttle position. In another example, TEC may be calculated using motor current and motor voltage. Examples of equations for calculating the TEC using the above three scenarios are as follows:

TEC Based on Speed (RPM) and Torque

TEC(i)=speed(i)×torque(i), where i=a timestamp index of the vehicle data; and where the calculation of the total energy consumed rate equal to the total energy consumed during each of the n epochs, $t_n$, comprises:

$$TEC(t_n)=\sum_{i=1}^{t} TEC(i)\times timedelta,$$

where timedelta=time elapsed between i and i−1, and t is the number of timestamps in the sample time interval, T.

TEC Based on Motor Current and Throttle Position

TEC(i)=input current(i)×throttle(i), where i=a timestamp index of the vehicle data; and where the calculation of the total energy consumed rate equal to the total energy consumed during each of the n epochs, $t_n$, comprises:

$$TEC(t_n)=\sum_{i=1}^{t} TEC(i)\times timedelta,$$

where timedelta=time elapsed between i and i−1, and t is the number of timestamps in the timedelta.

TEC Based on Motor Current and Motor Voltage

TEC(i)=input current(i)×throttle(i), where i=a timestamp index of the vehicle data; and where the calculation of the total energy consumed rate equal to the total energy consumed during each of the n epochs, $t_n$, comprises:

$$TEC(t_n)=\sum_{i=1}^{t} TEC(i)\times timedelta,$$

where timedelta=time elapsed between i and i−1, and t is the number of timestamps in the timedelta.

The equations above for calculating TEC are set forth as examples and are in no way provided to limit how TEC is calculated in other implementations.

The resampled data 322 may be further processed by determining TEC rates, SOC rates, and epoch speeds (odometer rates) at each epoch. Table 332 in FIG. 3B shows the SOC_rate, TEC_rate, and Odometer_rate for each epoch in the second merged data set 322 in FIG. 3A. The epoch rates data 332 is shown in FIG. 3B where:

TEC rate=total energy consumed within each epoch (T/n period)

SOC rate=SOC consumption in 20 minutes odometer rate=distance traveled in 20 minutes.

As shown in FIG. 3B, the TEC_rate and Odometer_rate at each T/n interval are generated as a series or sequence of epoch data sets, T1, T2, T3, where T3 is the most recent of the epochs. The series of epochs, Tn, is used to determine a predicted epoch data set, T4, as discussed at step 208 in FIG. 2.

Figure 4:
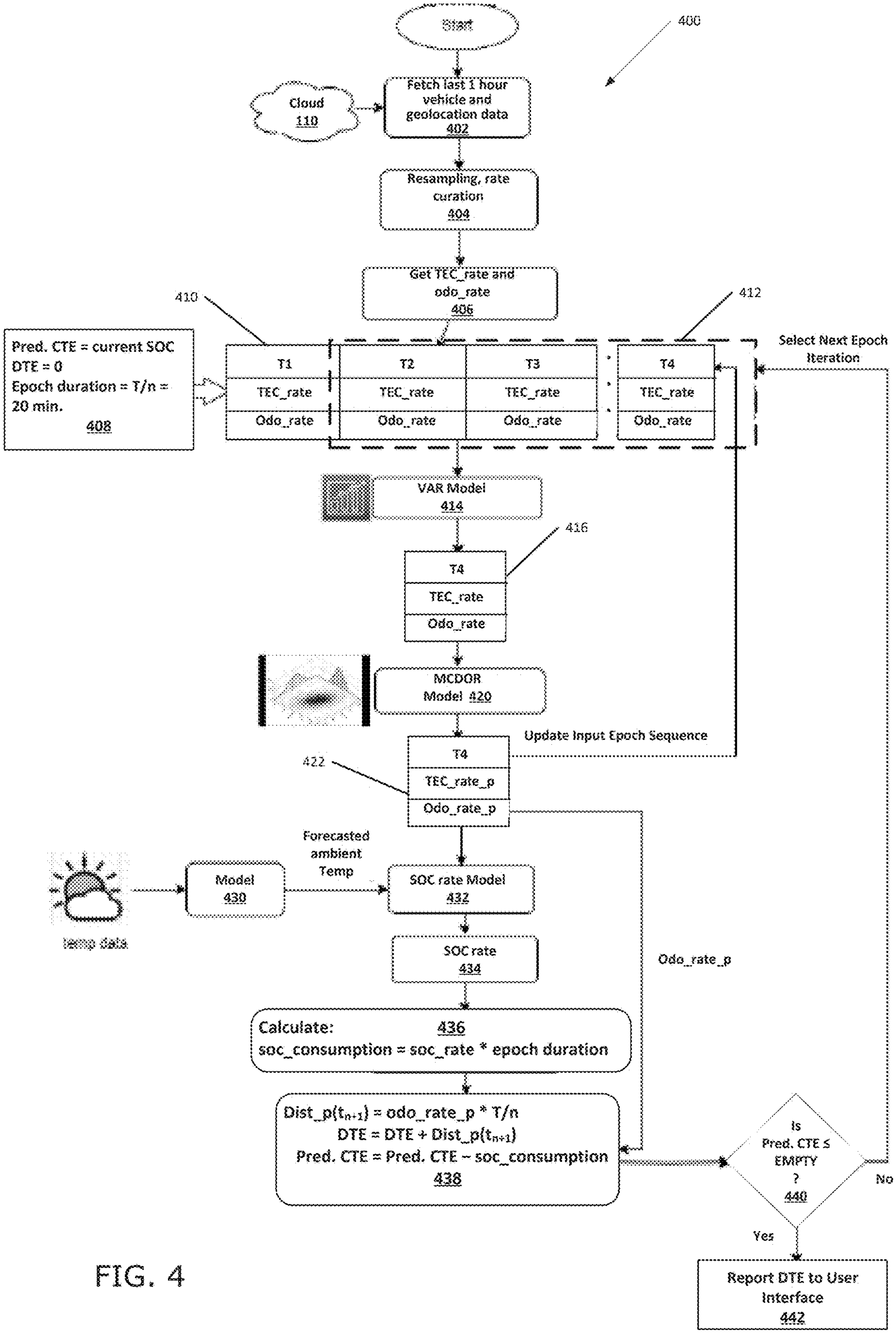
FIG. 4 is a schematic diagram depicting operation of the system shown in FIG. 1.

FIG. 4 is a schematic diagram depicting operation of an example of a method 400 that may be performed using the system shown in FIG. 1. The example in FIG. 4 uses a time period T=60 minutes and a number of epochs n=3 defining epochs of T/n=20 minutes. At step 402, the DTE prediction system receives vehicle and geo data collected and stored in the electric vehicle data storage system over a period of one hour. The data collected is for the most recent one hour of data. The vehicle data includes timestamps, and for each timestamp, a TEC data set and the SOC. As noted above with reference to FIG. 3A, the TEC data set may include data elements or signals that depend on what is available in a given vehicle. For purposes of illustration, the TEC data set in the example includes motor speed (RPM) and torque.

At step 404, the data is merged and resampled as described at 306 and 320 in FIG. 3A. At step 408, a predicted charge-to-empty value is initialized to the current value of the SOC, which corresponds to the most recent SOC received in the vehicle data. At step 408, a distance to empty (DTE) value is initialized to zero.

The resampled data from step 404 is processed at step 406 to derive TEC rates, SOC rates, and odometer rates as described at 330 in FIG. 3A. Step 406 generates 3 epoch data structures as shown at 410 (T1, T2, T3).

At step 414, the three epoch data structures (T1, T2, T3) are input to a vector autoregression (VAR) model to provide a predicted epoch data structure, T4 at step 416. The predicted epoch data structure, T4, includes a predicted TEC rate and a predicted epoch speed. The example in FIG. 4 includes a Multivariate Conditional Distribution Outlier Rejection (MCDOR) model to receive the predicted epoch data structure and to filter T4 for outliers.

The predicted epoch data structure, T4, is input to a SOC rate model. The geo data received at step 402 may be used as input to a weather sync database to obtain an ambient temperature based on the vehicle's current location. A weather forecast model 430 may be included to obtain a forecasted ambient temperature, which is input to the SOC rate model at step 432.

At step 434, the SOC rate model generates a predicted SOC rate, which corresponds to the expected charge that will be consumed in the next 20 minutes (T/n). At step 436, the predicted SOC rate is multiplied by the epoch duration, T/n=20 minutes, to obtain a predicted SOC consumption for the next epoch.

At step 438, a predicted distance (Dist_p($t_{n+1}$)) in the next epoch is determined by multiplying the predicted odometer rate from the predicted epoch data structure by the epoch duration. The DTE value initialized at step 408 and updated at each pass through the method is updated by adding the predicted distance (Dist_p($t_{n+1}$)) to the DTE and stored as an updated DTE. The predicted CTE, initialized at step 408 and update at each pass through the method is also updated by subtracting the predicted SOC consumption from step 436 from the predicted CTE, and is stored as an updated predicted CTE.

At decision block 440, the updated value of the predicted CTE is checked to determine if it is less than or equal to an EMPTY value. The EMPTY value is a predetermined charge level that is understood to mean that the batter is empty. It may be 0% or some low level above 0%. If the predicted CTE indicates empty (YES path), the DTE is reported at step 442 to the driver on the user interface as the distance the vehicle can travel before the battery is discharged.

If the predicted CTE does not indicate EMPTY (NO path), a next set of epoch data structures 412 is formed by including the predicted epoch data structure T4 to the n−1 most recent epoch data structures. The method then continues as described above at step 414. The method may repeat until the predicted CTE is at EMPTY in decision block 440.

It is understood that various attributes and elements from any one configuration can also be included in other configurations. Although the present disclosure has been described in detail with reference to certain preferred configurations thereof, other versions are possible. The actual scope of the disclosure encompasses not only the disclosed configurations, but also all equivalent ways of practicing or implementing the disclosure. The above detailed description of the configurations of the disclosure is not intended to be exhaustive or to limit the disclosure to the precise form disclosed above or to the particular field of usage mentioned in this disclosure. While specific configurations of, and examples for, the disclosure are described above for illustrative purposes, various equivalent modifications are possible within the scope of the disclosure, as those skilled in the relevant art will recognize. The elements and acts of the various configurations described above may be combined to provide further configurations. Further, the teachings of the disclosure provided herein may be applied to products and systems other than travel pillows.

The invention claimed is:

1. A system for predicting a driving range of an electric vehicle power source comprising:

an on-board diagnostic (OBD) device configured to interface with an electric vehicle's engine control unit (ECU) via an OBD port to receive real-time vehicle data from a vehicle data management system, and stored electric vehicle data from an electric vehicle data storage system, where the vehicle data includes a timestamp, and for each timestamp, a current state of charge and a total energy consumption data set comprising at least one of: motor speed and torque data, input current and throttle data, or input current and voltage data, and where the vehicle data is collected over time for storage in the electric vehicle data storage system;

a distance-to-empty predictor comprising executable instructions stored as computer programs in a memory system configured to control electric vehicle battery management operations; and a processor configured to execute the executable instructions of the computer programs of the distance-to-empty predictor to automatically control display of range information to a vehicle operator, where when executed, the distance-to-empty predictor:

receives a sample set of vehicle data collected over a sample time period, T, prior to a current time from the electric vehicle storage system via the OBD device interfacing with the ECU, and receives a current temperature measurement from a geophysical position sensor integrated with the OBD device;

automatically initializes in the memory system a predicted charge-to-empty to the state of charge at the current time, and a distance-to-empty to zero;

automatically constructs in the memory system a first set of n epoch data structures, D(Tn), corresponding to n epochs, tn, in the sample time period, T, with an epoch duration, T/n, each epoch data structure comprising a total energy calculated by the processor using specific vehicle sensor data during each of the n epochs, which is calculated using the total energy consumption data set in the vehicle data, and where the epoch speed is calculated by the processor based on a distance data obtained from the vehicle's odometer or GPS coordinates traveled over each epoch;

automatically generate in the memory system a predicted epoch data structure, D(Tn+1), including a predicted total energy consumed rate and a predicted epoch speed corresponding to a next epoch, tn+1, using the set of n epoch data structures, D(Tn), as inputs to a statistical model pre-trained with historical electric vehicle performance data to model a relationship between the total energy consumed rates and epoch speeds over a next epoch tn+1;

automatically generate using the processor a predicted state of charge rate for the next epoch, tn+1, by inputting the temperature measurement and the predicted total energy consumption rate to a state of charge rate prediction model trained on electric vehicle battery discharge characteristics;

automatically calculate using the processor a state of charge consumption by multiplying the predicted state of charge rate for the next epoch, tn+1, by the epoch duration;

automatically calculate using the processor a predicted next epoch distance based on the predicted epoch speed and the epoch duration;

automatically update in the memory system the distance-to-empty by adding the predicted next epoch distance to a current value of the distance-to-empty;

automatically update in the memory system the predicted charge-to-empty by subtracting the state of charge consumption from a current value of the predicted charge-to-empty;

automatically control a vehicle user interface display to report to a user interface the distance-to-empty when the predicted charge-to-empty is less than or equal to an EMPTY_VALUE; and when the predicted charge-to-empty is not less than or equal to EMPTY_VALUE:

automatically construct in the memory system a next set of n data structures including the predicted data structure, D(Tn+1), and the most recent n−1 epoch data structures in the previous set of n epoch data structures and repeat generating a predicted epoch data structure for a next epoch, generating the predicted state of charge rate for a next epoch, estimating the state of charge consumption for the next epoch, calculating the predicted next epoch distance, and updating the distance-to-empty and predicted charge-to-empty until the predicted charge-to-empty is less than or equal to EMPTY_VALUE.

2. The system of claim 1, where the total energy consumption data set received as vehicle data includes a torque and a motor speed, and the calculation of the total energy consumption during each of the n epochs includes calculating a total energy consumption at each timestamp of the vehicle data received using:

TEC(i)=speed(i)×torque(i), where i=a timestamp index of the vehicle data; and where the calculation of the total energy consumed rate equal to the total energy consumed during each of the n epochs, $t_n$, comprises:

$$TEC(t_n) = \sum_{i=1}^{t} TEC(i) \times timedelta,$$

where timedelta=time elapsed between i and i−1, and t is the number of timestamps in the sample time interval, T.

3. The system of claim 1, where the total energy consumption data set received as vehicle data includes a input current and a throttle, and the calculation of the total energy consumption during each of the n epochs includes calculating a total energy consumption at each timestamp of the vehicle data received using:

TEC(i)=input current(i)×throttle(i), where i=a timestamp index of the vehicle data; and where the calculation of the total energy consumed rate equal to the total energy consumed during each of the n epochs, $t_n$, comprises:

$$TEC(t_n) = \sum_{i=1}^{t} TEC(i) \times timedelta,$$

where timedelta=time elapsed between i and i−1, and t is the number of timestamps in the sample time interval, T.

4. The system of claim 1, where the total energy consumption data set received as vehicle data includes an input current and an input voltage, and the calculation of the total energy consumption during each of the n epochs includes calculating a total energy consumption at each timestamp of the vehicle data received using:

TEC(i)=input current(i)×input voltage(i), where i=a timestamp index of the vehicle data; and where the calculation of the total energy consumed rate equal to the total energy consumed during each of the n epochs, $t_n$, comprises:

$$TEC(t_n) = \sum_{i=1}^{t} TEC(i) \times timedelta,$$

where timedelta=time elapsed between i and i−1, and t is the number of timestamps in the sample time interval, T.

5. The system of claim 1 where the statistical model pre-trained to model the relationship between the total energy consumed rates and epoch speeds over the next epoch includes a vector autoregression model.

6. The system of claim 1 where the distance to empty predictor is configured to, after generating the predicted data structure:

filter the predicted data set, $D(T_{n+1})$, using an outlier rejection model.

7. The system of claim 6 where the outlier rejection model includes a Multivariate Conditional Distribution Outlier Rejection (MCDOR) model.

8. The system of claim 1 where the distance to empty predictor is configured to, in generating the predicted state of charge rate, the state of charge rate prediction model includes a deep learning model.

9. The system of claim 8 where the deep learning model is a feed-forward neural network.

10. The system of claim 1 where the vehicle data includes odometer readings at the timestamp, and the distance to empty predictor is further configured to:

use the odometer readings to determine the distance traveled between each timestamp of the vehicle data;

adding the distance traveled between each timestamp to determine the distance traveled over each epoch; and use the geolocation data in determining the temperature value at the current location.

11. The system of claim 1 where the distance to empty predictor is further configured to:

use geolocation data to determine the distance traveled between each timestamp of the geolocation data;

adding the distance traveled between each timestamp to determine the distance traveled over each epoch.

12. A method of predicting a driving range of an electric vehicle comprising:

receiving, via an on-board diagnostic (OBD) device interfacing with an electric vehicle's engine control unit (ECU), a sample set of vehicle data from a vehicle data management system collected over a sample time period, T, prior to a current time from a electric vehicle storage system, and a current temperature measurement from a geophysical position sensor;

automatically initializing, by a processor in a memory system, a predicted charge-to-empty to the state of charge at the current time, and a distance-to-empty to zero;

automatically constructing, by the processor in the memory system, a first set of n data structures, $D(T_n)$, corresponding to n epochs $t_n$, in the sample time period, T, with an epoch duration, T/n, each data structure comprising a total energy consumed rate and an epoch speed, where the total energy consumed rate is calculated using specific vehicle sensor data during each of the n epochs, which is calculated using the total energy consumption data set in the vehicle data, and where the epoch speed is based on a distance traveled over each epoch;

automatically generating, by the processor, a predicted data structure, $D(T_{n+1})$, including a predicted total energy rate and a predicted epoch speed corresponding to a next epoch, $t_{n+1}$, using the set of n data structures, $D(T_n)$, as inputs to a statistical model pre-trained with historical electric vehicle performance data to model a relationship between the total energy consumed rates and epoch speeds over a next epoch $t_{n+1}$;

automatically generating, by the processor, a predicted state of charge rate (soc rate) for the next epoch, $t_{n+1}$, by inputting the temperature measurement and the predicted total energy consumption rate to a state of charge rate prediction model trained on electric vehicle battery discharge characteristics;

automatically computing, by the processor, a state of charge consumption by obtaining a predicted state of charge rate for the next epoch, $t_{n+1}$, and multiplying the epoch duration by the predicted state of charge rate;

automatically calculating, by the processor, a predicted next epoch distance based on the adjusted predicted epoch speed and the epoch duration;

updating, by the processor, the distance-to-empty by adding the predicted next epoch distance to a current value of the distance-to-empty;

automatically updating, by the processor in the memory system, the predicted charge-to-empty by subtracting the state of charge consumption from a current value of the predicted charge-to-empty;

automatically controlling, by the processor, a vehicle user interface display to report the distance-to-empty when the predicted charge-to-empty is less than or equal to an EMPTY_VALUE; and when the predicted charge-to-empty is not less than or equal to EMPTY_VALUE:

automatically constructing, by the processor in the memory system, a next set of n data structures including the predicted data structure, $D(T_{n+1})$, and the most recent n−1 data structures in the previous set of n data structures and repeat generating a predicted data structure for a next epoch, generating the predicted state of charge rate for a next epoch, estimating the state of charge consumption for the next epoch, calculating the predicted next epoch distance, and updating the distance-to-empty and predicted charge-to-empty until the predicted charge-to-empty is less than or equal to EMPTY_VALUE.

13. The method of claim 12, where the total energy consumption data set received as vehicle data includes a torque and a motor speed, and the calculation of the total energy consumption during each of the n epochs includes calculating a total energy consumption at each timestamp of the vehicle data received using:

TEC(i)=speed(i)×torque(i), where i=a timestamp index of the vehicle data; and where the calculation of the total energy consumed rate equal to the total energy consumed during each of the n epochs, $t_n$, comprises:

$$TEC(t_n) = \sum\nolimits_{i=1}^{t} TEC(i) \times timedelta,$$

where timedelta=time elapsed between i and i−1, and t is the number of timestamps in the sample time interval, T.

14. The method of claim 12, where the total energy consumption data set received as vehicle data includes a input current and a throttle, and the calculation of the total energy consumption during each of the n epochs includes calculating a total energy consumption at each timestamp of the vehicle data received using:

TEC(i)=input current(i)×throttle(i), where i=a timestamp index of the vehicle data; and where the calculation of the total energy consumed rate equal to the total energy consumed during each of the n epochs, $t_n$, comprises:

$$TEC(t_n) = \sum\nolimits_{i=1}^{t} TEC(i) \times timedelta,$$

where timedelta=time elapsed between i and i−1, and t is the number of timestamps in the sample time interval, T.

15. The method of claim 12, where the total energy consumption data set received as vehicle data includes an input current and an input voltage, and the calculation of the total energy consumption during each of the n epochs includes calculating a total energy consumption at each timestamp of the vehicle data received using:

TEC(i)=input current(i)×input voltage(i), where i=a timestamp index of the vehicle data; and where the calculation of the total energy consumed rate equal to the total energy consumed during each of the n epochs, $t_n$, comprises:

$$TEC(t_n) = \sum\nolimits_{i=1}^{t} TEC(i) \times timedelta,$$

where timedelta=time elapsed between i and i−1, and t is the number of timestamps in the sample time interval, T.

16. The method of claim 12 where in the step of generating the predicted data structure, the statistical model pre-trained to model the relationship between the total energy consumed rates and epoch speeds over the next epoch includes a vector autoregression model.

17. The method of claim 12 where the distance to empty predictor is configured to perform the step of:

filtering the predicted data set, $D(T_{n+1})$, using an outlier rejection model, after generating the predicted data structure.

18. The method of claim 17 where the outlier rejection model includes a Multivariate Conditional Distribution Outlier Rejection (MCDOR) model.

19. The method of claim 12 where, in generating the predicted state of charge rate, the state of charge rate prediction model includes a deep learning model.

20. The method of claim 19 where the deep learning model is a feed-forward neural network.

21. The method of claim 12 where the vehicle data includes odometer readings at the timestamp, the method comprising:

using the odometer readings to determine the distance traveled between each timestamp of the vehicle data;

adding the distance traveled between each timestamp to determine the distance traveled over each epoch; and using the geolocation data in determining the temperature value at the current location.

22. The method of claim 12 further comprising:

using geolocation data to determine the distance traveled between each timestamp of the geolocation data; and adding the distance traveled between each timestamp to determine the distance traveled over each epoch.

* * * * *